G. E. END.
VEHICLE.
APPLICATION FILED MAR. 29, 1918.
1,308,232.
Patented July 1, 1919.
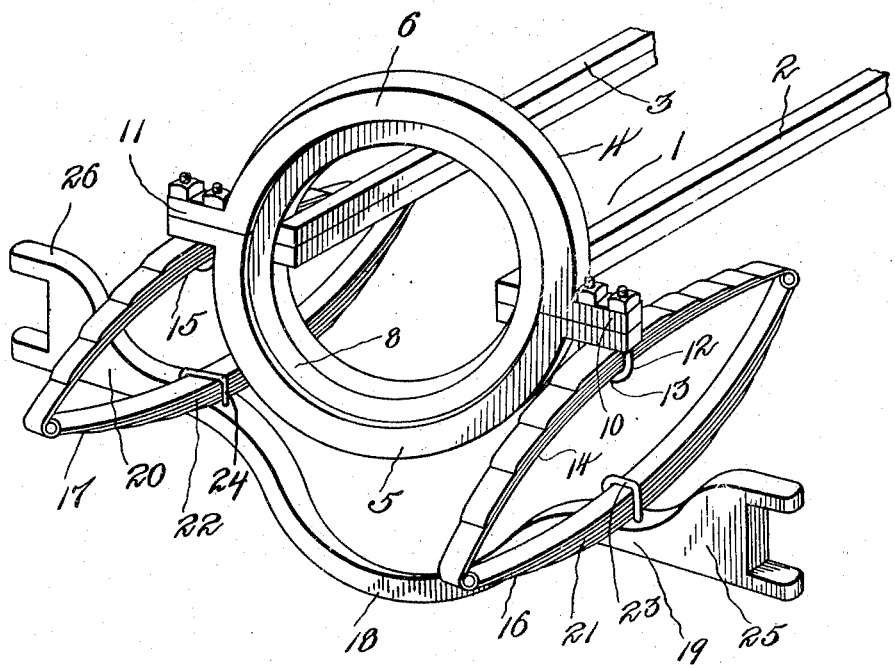
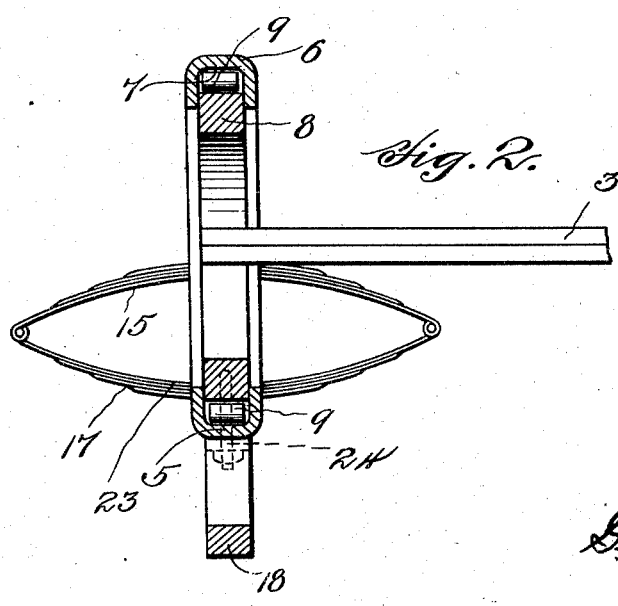
Inventor
George E End

UNITED STATES PATENT OFFICE.

GEORGE E. END, OF SVENSEN, OREGON.

VEHICLE.

1,308,232. Specification of Letters Patent. Patented July 1, 1919.

Application filed March 29, 1918. Serial No. 225,566.

*To all whom it may concern:*

Be it known that I, GEORGE E. END, a citizen of the United States, residing at Svensen, in the county of Wasco and State of Oregon, have invented certain new and useful Improvements in Vehicles, of which the following is a specification.

This invention relates to an automobile chassis and has for its object to provide means whereby the frame may have movement relative to the axle of the machine.

Another object of the invention is to provide a connection between a vehicle frame and its axle whereby the axle may have oscillative movement relative to the frame.

With the above and other objects in view, I have invented the device illustrated in the accompanying drawings in which:

Figure 1 is a perspective view of a portion of a chassis embodying my invention, and Fig. 2 is a vertical section thereof.

Like reference characters indicate like parts throughout the following specification and in the views in the drawings in which 1 indicates the chassis of an automobile having frame members 2 and 3 to the outer ends of which is fixed a ring 8 rotatable in the circular race way 4. The race way 4 is formed of two semi-circular members 5 and 6, said members having an inner annular channel 7 in which the body supporting ring 8 rotates, said ring being supported upon roller bearings 9 in the channel 7. The members 5 and 6 have right angular extensions 10 and 11 at each end thereof which are held together by U-bolts 12 projecting through openings in said extensions, the lower portions 13 of said U-bolts engaging the upper parts 14 and 15 of the springs 16 and 17 whereby said springs are held to the frame.

The front axle 18 has its central portion formed arcuate to conform to the arc of the member 4 and has its ends 19 and 20 fixed to the lower portions 21 and 22 of the springs 16 and 17 by means of U-bolts 23 and 24, shown dotted Fig. 2, the wheel engaging knuckles 25 and 26 extending outwardly of said springs. The ring 8 is adapted to support the weight of the forward portion of a body to be mounted on said chassis as well as the engine frame, etc.

The above described oscillating device will permit of movement of the wheels, axle and springs without transmitting the motion to the body, and thus save the body from a comparatively large percentage of shocks received by the axle through the wheels. As there is practically no friction between the supporting ring 8 and the upper semicircular member 6, no rollers are provided or necessary in the latter member.

Having now described my invention, that which I claim to be new and desire to procure by Letters Patent is:

1. In a vehicle having an axle and a frame, means whereby the axle has oscillating movement relative to and independent of the frame, said means consisting of a pair of vertically disposed rings.

2. In a vehicle having an axle and a frame, means whereby the axle has oscillating movement relative to the frame, springs upon which said means is supported, said means consisting of a pair of vertically disposed rings, mounted one within the other.

3. In a vehicle having an axle and a frame, means whereby the axle has oscillating movement relative to the frame, springs upon which said means is supported, said means consisting of a pair of vertically disposed rings, mounted one within the other, the inner ring forming a support for said frame.

4. In a vehicle having an axle and a frame, means whereby the axle has oscillating movement relative to the frame, springs upon which said means is supported, said means consisting of a pair of vertically disposed rings, mounted one within the other, the inner ring forming a support for said frame, the outer ring having an annular inner channel in which the inner ring is rotatably mounted.

5. In a vehicle having an axle and a frame, means whereby the axle has oscillating movement relative to the frame, springs upon which said means is supported, said means consisting of a pair of vertically disposed rings, mounted one within the other, the inner ring forming a support for said frame, the outer ring having an annular inner channel in which the inner ring is rotatably mounted, said outer ring being formed in two sections.

6. In a vehicle having an axle and a frame, means whereby the axle has oscillating movement relative to the frame, springs upon which said means is supported, said means consisting of a pair of vertically disposed rings, mounted one within the other, the inner ring forming a support for said frame, the outer ring having an annular inner channel in which the inner ring is rotatably mounted, said outer ring being formed in two sections, and a common means for securing said sections together and securing the outer ring to said springs.

7. In a vehicle having an axle and a frame, means whereby the axle has oscillating movement relative to the frame, springs upon which said means is supported, said means consisting of a pair of vertically disposed rings, mounted one within the other, the inner ring forming a support for said frame, the outer ring having an annular inner channel in which the inner ring is rotatably mounted, said outer ring being formed in two sections, and a common means for securing said sections together and securing the outer ring to said springs, roller bearings between said rings.

8. In a vehicle having an axle and a frame, means whereby the axle has oscillating movement relative to the frame, springs upon which said means is supported, said means consisting of a pair of vertically disposed rings, mounted one within the other, the inner ring forming a support for said frame, the outer ring having an annular inner channel in which the inner ring is rotatably mounted, said outer ring being formed in two sections, and a common means for securing said sections together and securing the outer ring to said springs, roller bearings between said rings, said rollers being provided in the lower-half of said sections.

9. In a vehicle chassis an axle, a frame having connection therewith and an oscillative member forming the connection, said member consisting of a pair of vertically disposed rings having relative movement.

10. In a chassis a frame and an axle, a connection therebetween consisting of a pair of vertically disposed members one of which is rotatable around the other.

11. In a chassis a frame and an axle, a connection therebetween consisting of a pair of vertically disposed members one of which is rotatable around the other, one of said members being fixed to the frame.

12. In a chassis a frame and an axle, a connection therebetween consisting of a pair of vertically disposed members one of which is rotatable around the other, one of said members being fixed to the frame, and the other being connected with the axle.

13. In a chassis a frame and an axle, a connection therebetween consisting of a pair of vertically disposed members one of which is rotatable around the other, one of said members being fixed to the frame, and the other being connected with the axle, springs forming said connection.

14. In a chassis a frame and an axle, a connection therebetween consisting of a pair of vertically disposed members one of which is rotatable around the other, one of said members being fixed to the frame, and the other being connected with the axle, springs forming said connection, said members being rings one within the other.

In testimony whereof I affix my signature in the presence of two witnesses.

GEORGE E. END.

Witnesses:
JOHN J. END,
J. E. WOODCOCK.

Copies of this patent may be obtained for five cents each, by addressing the "Commissioner of Patents, Washington, D. C."